United States Patent
Yue et al.

(10) Patent No.: US 8,425,028 B2
(45) Date of Patent: Apr. 23, 2013

(54) REDUCING DAMAGING EFFECTS OF DISSOLUTION WITHIN AN INK-JET PRINTHEAD

(75) Inventors: Shunqiong Yue, San Diego, CA (US); Anne Kelly-Rowley, Midland, MI (US); Dennis Z. Guo, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 419 days.

(21) Appl. No.: 12/677,797

(22) PCT Filed: Sep. 8, 2008

(86) PCT No.: PCT/US2008/075603
§ 371 (c)(1),
(2), (4) Date: Jun. 16, 2010

(87) PCT Pub. No.: WO2009/035944
PCT Pub. Date: Mar. 19, 2009

(65) Prior Publication Data
US 2010/0271448 A1    Oct. 28, 2010

Related U.S. Application Data

(60) Provisional application No. 60/993,569, filed on Sep. 12, 2007.

(51) Int. Cl.
*G01D 11/00*    (2006.01)
(52) U.S. Cl.
USPC .......................................... 347/100

(58) Field of Classification Search ............ 347/45, 347/100; 106/31.27, 31.6, 31.95
See application file for complete search history.

(56) References Cited

U.S. PATENT DOCUMENTS

| | | | |
|---|---|---|---|
| 4,361,842 A | 11/1982 | Haruta et al. | |
| 5,198,023 A | 3/1993 | Stoffel | |
| 5,571,313 A * | 11/1996 | Mafune et al. | 106/31.43 |
| 5,792,249 A | 8/1998 | Shirota et al. | |
| 5,980,622 A | 11/1999 | Byers | |
| 5,997,622 A | 12/1999 | Weber et al. | |
| 6,001,161 A | 12/1999 | Evans et al. | |
| 6,106,598 A * | 8/2000 | Iijima | 106/31.27 |
| 6,188,414 B1 | 2/2001 | Wong et al. | |
| 6,217,166 B1 | 4/2001 | Saito et al. | |
| 6,412,921 B1 | 7/2002 | Manini | |
| 6,435,659 B1 | 8/2002 | Bruinsma et al. | |
| 7,883,185 B2 * | 2/2011 | Tomioka et al. | 347/56 |
| 2007/0052761 A1 | 3/2007 | Jones et al. | |

FOREIGN PATENT DOCUMENTS

| | | |
|---|---|---|
| EP | 1231246 A1 | 8/2002 |
| EP | 1231246 B1 | 5/2008 |

* cited by examiner

*Primary Examiner* — Anh T. N. Vo

(57) ABSTRACT

The present invention is drawn to systems and methods for suppressing damaging effects from dissolution of silica present in an ink-jet printhead which contains high pH, pigmented ink. The systems and methods suppress the damaging effects of dissolution of silica by the action of a basic ink by adding a metal ion to the ink composition which forms a complex with the silica. The metal ion passivates the silica thus retarding the dissolution of silica thereby reducing promotion of ink kogation, silicate ring formation, and silicate deposit on ink-jet printhead resistors which effectively improves durability and shelf life of the ink-jet printhead.

22 Claims, No Drawings

REDUCING DAMAGING EFFECTS OF DISSOLUTION WITHIN AN INK-JET PRINTHEAD

This application claims the benefit of U.S. Provisional Patent Application No. 60/993,569, filed on Sep. 12, 2007.

BACKGROUND

The use of microchips is well known in printing applications. For example, ink-jet printheads commonly contain microchips, and these microchips are often referred to as dice (die for a single structure). Dice contain the integrated circuitry necessary to control the jetting of ink required for printing. They also generally contain slots that are used to effectuate the transfer of ink from the ink tank or storage unit to the emission or nozzle components, providing for the flow of ink during printing applications. In many cases, much of the dice is made primarily from silicon. This is common for the dice used in ink-jet printheads. One problem with silicon dice in the thermal ink-jet printing process is that contact with some basic inks results in dissolution of the silica and redeposition at undesirable locations within the ink-jet printhead. A second problem is that ink-jet cartridges contain many glass-filled parts which may also be attacked by high pH inks. These problems lead to reliability issues such as kogation, silicate ring formation, and silicate deposition on resistors with consequent fouling of the surface of the resistor element, all negatively impacting performance, e.g., reduced image quality and reliability.

DETAILED DESCRIPTION

Before the present invention is disclosed and described, it is to be understood that this disclosure is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the context clearly dictates otherwise. For example, reference to a silicon die structure would typically include silicon dice.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, "liquid vehicle" is defined to include liquid compositions that can be used to carry colorants, including pigments, to a substrate. Liquid vehicles are well known in the art, and a wide variety of ink vehicles may be used in accordance with embodiments of the present disclosure. Such ink vehicles may include a mixture of a variety of different agents, including without limitation, surfactants, solvents, co-solvents, buffers, biocides, viscosity modifiers, sequestering agents, stabilizing agents, and water. Though not part of the liquid vehicle per se, in addition to the colorants, the liquid vehicle can carry solid additives such as polymers, latex particulates, UV curable materials, plasticizers, salts, etc. Further, in accordance with embodiments of the present disclosure, the liquid vehicle can also carry a soluble metal ion such as a salt.

As used herein, "kogation" is defined to include the process of build-up of residue on the resistor surface or other areas within the ink-jet printhead due to the breakdown of the ink components or other elements of the ink-jet printhead from repeated heating of the resistor element, or from chemical interactions of the ink with surfaces of the ink-jet printhead or other components in the ink composition interacting with each other. In accordance with embodiments of the present disclosure, one example of kogation is dissolution of silica from the surface of die trenches within an ink-jet pen due to interaction with basic pH inks.

As used herein, "silica ring formation" is defined to include silica deposits that form rings near the edge of nozzles in the ink-jet ink printhead.

As used herein, "passivate," "passivation," or a derivative thereof, is defined to include treating, mixing, reacting or coating the surface of a component of an ink-jet printhead in order to reduce the chemical reactivity of its surface with the ink or other material contained therein. In accordance with embodiments of the present disclosure, the surface of a silicon die or dice within an ink-jet pen is/are reacted with a metal ion in accordance with the present disclosure to reduce the chemical reactivity of the silica.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

It has been recognized that it would be advantageous to develop basic inks that are capable of reducing the negative effects of dissolution of silica in an ink-jet ink printhead. In accordance with this, a system for suppressing damaging effects from dissolution of silica in an ink-jet printhead containing basic pH ink can comprise an ink-jet printhead including a silicon die structure, and a basic pH ink loaded in the ink-jet printhead which contacts the die structure during normal storage or use. The basic pH ink can include a liquid vehicle, a colorant, e.g., pigment and optionally a dye, and a trivalent metal ion. In one specific embodiment, the trivalent metal ion can comprise or consist essentially of ferric iron [Fe(III)]. In another embodiment, the trivalent metal ion can comprise or consist essentially of aluminum [Al(III)]. In still another embodiment, the trivalent metal ion can comprise or consist essentially of chromium [Cr(III)]. Additionally, any combination of ferric iron [Fe(III)], aluminum [Al(III)], and chromium [Cr(III)] can also be used. The metal ion or ions can passivate the silica surface by forming a metal ion-silicate complex, thus suppressing the damaging effects or dissolution of silica within the printhead.

In another embodiment, a method of suppressing damaging effects from dissolution of silica in an ink-jet printhead containing a basic pH ink can comprise adding a metal ion to the basic pH ink prior to or after the basic pH ink is loaded in the ink-jet printhead. The trivalent metal ion can be selected from any trivalent metal ion capable of passivating the silica surface. Non-limiting examples of useful trivalent metal ions include ferric iron, aluminum, chromium, and combinations thereof. As mentioned, the metal ion can be added at a concentration that passivates the silica surface by forming a metal ion-silicate complex thus retarding the dissolution of silica. This reduces the promotion of ink kogation, silicate ring formation, and silicate deposit on ink-jet printhead resistors, which effectively improves durability and shelf life of the ink-jet printhead.

In either of these embodiments, the trivalent metal ion can be in the form of a salt. In another embodiment, the metal ion can be supplied by an elemental metal. In still another embodiment, the basic ink can have a pH greater than 8, and in some embodiments, the pH can be greater than 9. It is notable that pH's outside this range can also be suitable, depending on the specific basic ink components. The amount of trivalent metal ion added to the ink can be any effective amount that does not significantly contribute to other negative printing issues, but is typically present at from about 5 ppm to about 100 ppm. In another embodiment, the amount of trivalent metal ion added to the ink can be from about 10 ppm to about 50 ppm. Amounts outside this range can be used depending on other factors that affect the amount of dissolution of silica within an ink-jet printhead, such as shelf life of the printhead. It is noted that these amounts are specifically added to the inks to reduce the negative effects of silicon die or dice dissolution.

In each of these embodiments, the colorant can be a pigment, or a pigment in combination with a dye. Regarding the pigment, it can be any of various types of pigments, including standard milled pigments that are dispersed by a separate dispersing agent, or self-dispersed pigments including polymer dispersed and small molecule dispersed pigments. The term "self-dispersed pigments," as referenced previously, includes pigments that have been modified by a polymer or a small molecule. The base pigment that can be modified and used can be of any color, such as red, black, magenta, cyan, yellow, blue, orange, violet, or pink, for example.

Examples of black pigments that can be used include carbon pigments. The carbon pigment can be almost any commercially available carbon pigment that provides acceptable optical density and print characteristics. Carbon pigments suitable for use include, without limitation, carbon black, graphite, vitreous carbon, charcoal, and combinations thereof. Such carbon pigments can be manufactured by a variety of known methods such as a channel method, a contact method, a furnace method, an acetylene method, or a thermal method, and are commercially available from such vendors as Cabot Corporation, Columbian Chemicals Company, Degussa AG, and E.I. DuPont de Nemours and Company. Suitable carbon black and other pigments include, without limitation, MONARCH 1400, MONARCH 1300, MONARCH 1100, MONARCH 1000, MONARCH 900, MONARCH 880, MONARCH 800, MONARCH 700, CAB-O-JET 200, and CAB-O-JET 300; RAVEN 7000, RAVEN 5750, RAVEN 5250, RAVEN 5000, and RAVEN 3500; Color Black FW 200, RAVEN FW 2, RAVEN FW 2V, RAVEN FW 1, RAVEN FW 18, RAVEN S160, RAVEN FW S170, Special Black 6, Special Black 5, Special Black 4A, Special Black 4, PRINTEX U, PRINTEX 140U, PRINTEX V, and PRINTEX 140V. Other pigments that can be used include CAB-O-JET 250C, CAB-O-JET 260M, CAB-O-JET 270Y; PALIOGEN Orange, HELIOGEN Blue L 6901F, HELIOGEN Blue NBD 7010, HELIOGEN Blue K 7090, HELIOGEN Blue L 7101F, PALIOGEN Blue L 6470, HELIOGEN Green K 8683, and HELIOGEN Green L 9140; CHROMOPHTAL Yellow 3G, CHROMOPHTAL Yellow GR, CHROMOPHTAL Yellow 8G, 1GRAZIN Yellow 5GT, IGRALITE Rubine 4BL, MONASTRAL Magenta, MONASTRAL Scarlet, MONASTRAL Violet R, MONASTRAL Red B, and MONASTRAL Violet Maroon B; DALAMAR Yellow YT-858-D and HEUCOPHTHAL Blue G XBT-583D; Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, NOVOPERM Yellow HR, NOVOPERM Yellow FGL, Hansa Brilliant Yellow 10GX, Permanent Yellow G3R-01, HOSTAPERM Yellow H4G, HOSTAPERM Yellow H3G, HOSTAPERM Orange GR, HOSTAPERM Scarlet GO, and Permanent Rubine F6B; QUINDO Magenta, INDOFAST Brilliant Scarlet, QUINDO Red R6700, QUINDO Red 86713, and INDOFAST Violet; and L74-1357 Yellow, L75-1331 Yellow, and L75-2577 Yellow.

The above list of pigments includes pigments that can be unmodified pigment particulates, small molecule attached pigment particulates, and polymer-dispersed pigment particulates. Unmodified pigments can be modified with small molecules or polymers to be used in accordance with embodiments of the present invention.

As described previously, small molecule-dispersed pigments refer to a type of self-dispersed pigment wherein a non-polymeric small molecule is attached to at least an outer shell of the pigment. For example, one type of pigment that is considered a small molecule-dispersed pigment is a carbon black pigment having a diazonium salt of an aromatic acid directly attached thereto by a covalent bond to the carbon.

Alternatively, polymer-dispersed pigments that are self-dispersed can be, for example, pigments modified with polymeric resins. These can be prepared beginning with a diazonium attachment group, which can be attached to a base carbon of the pigment. The intermediate structure can then be treated with appropriate polymers to form anionic, cationic, or nonionic black pigments. The reactive group can be a vinyl sulphone, for example, as vinyl sulphone groups can be a very versatile intermediate to attach polymers to carbon. Amines can readily add to the vinyl bond to form cationic or nonionic pigments. Further, thermal condensation with the amine attached pigments and styrene-acrylic acid polymers can then be used to form anionic pigments, if desired. There are also numerous other methods that can be used to prepare polymer-dispersed pigments, as are known by those skilled in the art.

When selecting polymers for use in attaching to or co-dispersing with pigments, several properties or conditions can be considered. For example, polymeric molecular weight and acid number can be considered. Though any functional molecular weight can be used, it has been discovered that polymers having a molecular weight from about 4,000 Mw to 15,000 Mw are particularly desirable for use. The higher molecular weight polymers tend to provide better durability, but also provide higher viscosity, which can be problematic for thermal ink-jet applications. However, there is more chance for particle interaction with the vehicle and with other particles when the polymer strands are long. An example of such a polymer includes styrene-acrylic polymers. Styrene/acrylic polymers, as well as other desirable polymers that can be used, include acid functional groups on the polymer chain.

In still further detail, the pigments of the present disclosure can be from about 30 nm to about 180 nm in average aggregate particle size. However, sizes outside this range can be used if the pigment can remain dispersed in the liquid vehicle and provide adequate color properties.

Various trivalent metal ion sources can be used in accordance with embodiments of the present disclosure, and include elemental metals and/or metal salts. Specific exemplary metals include aluminum, ferric iron, chromium, and the like, as well as combinations thereof. The metal ions of the present disclosure are cationic. In accordance with an embodiment of the present disclosure, the compound aluminum silicate, which contains a trivalent aluminum ion ($Al_2SiO_5$), is formed when an aluminum salt is added to a basic pH ink, which reacts with the silicon on the surface of an ink-jet pen or other ink-jet printhead components made substantially from silicon. By way of just a few examples, specific metal salts that can be used in accordance with embodiments of the present disclosure include aluminum nitrate, aluminum chloride, and/or iron (III) nitrate. The amount of trivalent metal ion added to the ink composition can very from about 5 ppm to about 100 ppm (based on metal ion content), and is typically from about 10 ppm to about 50 ppm.

The ink-jet ink compositions of the present disclosure are typically prepared using an aqueous formulation or liquid vehicle which can include water, cosolvents, surfactants, buffering agents, biocides, sequestering agents, viscosity modifiers, humectants, binders, and/or other known additives.

As described, cosolvents can be included in the ink-jet compositions of the present disclosure. Suitable cosolvents for use in the present disclosure include water soluble organic cosolvents, but are not limited to, aliphatic alcohols, aromatic alcohols, diols, pyrrolidone, glycol ethers, poly(glycol) ethers, lactams, formamides, acetamides, long chain alcohols, ethylene glycol, propylene glycol, diethylene glycols, triethylene glycols, tetraethylene glycol, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones. For example, cosolvents can include primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, lactams, substituted formamides, unsubstituted formamides, substituted acetamides, and unsubstituted acetamides. Specific examples of cosolvents that can be used include, but are not limited to, 1,5-pentanediol, 1,2-hexanediol, 2-pyrrolidone, LEG-1,2-ethyl-2-hydroxymethyl-1, 3-propanediol, diethylene glycol, 3-methoxybutanol, and 1,3-dimethyl-2-imidazolidinone. Cosolvents can be added to reduce the rate of evaporation of water in the ink-jet to minimize clogging or other properties of the ink such as viscosity, pH, surface tension, optical density, and print quality. The cosolvent concentration can range from about 3 wt % to about 50 wt %. Multiple cosolvents can also be used, as is known in the art.

Various buffering agents or pH adjusting agents can also be optionally used in the inkjet ink compositions of the present invention. Typical buffering agents include such pH control solutions as hydroxides of alkali metals and amines, such as lithium hydroxide, sodium hydroxide, potassium hydroxide; citric acid; amines such as triethanolamine, diethanolamine, and dimethylethanolamine; hydrochloric acid; and other basic or acidic components which do not substantially interfere with the bleed control or optical density characteristics of the present invention. If used, buffering agents typically comprise less than about 10 wt % of the ink-jet ink composition.

In another aspect of the present invention, various biocides can be used to inhibit growth of undesirable microorganisms. Several non-limiting examples of suitable biocides include benzoate salts, sorbate salts, commercial products such as NUOSEPT (International Specialty Products), UCARCIDE (DOW Chemical), VANCIDE (R.T. Vanderbilt Company, Inc.), and PROXEL (Arch Chemicals, Inc.) and other known biocides. Typically, such biocides comprise less than about 5 wt % of the ink-jet ink composition and often from about 0.1 wt % to about 0.25 wt %.

In one aspect of the present invention, the ink-jet ink compositions can include standard surfactants such as alkyl polyethylene oxides, alkyl phenyl polyethylene oxides, polyethylene oxide (PEO) block copolymers, acetylenic PEO, PEO esters, PEO amines, PEO amides, and dimethicone copolyols. If used, surfactants can be present at from 0.001 wt % to 4 wt % of the ink-jet ink composition, and in one embodiment, can be present at from 0.001 wt % to 0.1 wt %.

EXAMPLES

The following example(s) illustrate the embodiments of the invention that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following examples provide further detail in connection with what are presently deemed to be the most practical and preferred embodiments of the invention. It is noted that though the present invention can use any color of pigment, and though any color of pigment is within the scope of the present invention, red pigments are primarily described herein by example to favorably illustrate unique advantages of the present invention.

Example 1

Preparation of Red Pigmented Ink-Jet Inks Containing Soluble Forms of Trivalent Metal Ions

TABLE 1

| Red Ink-jet ink (Formulation 1) | |
| --- | --- |
| Components | Batch wt % |
| Styrene Acrylic Polymer (MW 5000) | 0.7 |
| Diethylene Glycol | 6 |
| LEG-1 | 1 |
| 2-Pyrrolidone | 10 |

TABLE 1-continued

Red Ink-jet ink (Formulation 1)

| Components | Batch wt % |
|---|---|
| 1,2-Hexanediol | 4 |
| Surfynol 440 | 0.5 |
| Zonyl FSO | 0.18 |
| Triethylamine | 0.5 |
| Aluminum [Al(III)]* | 0.002 (20 ppm) |
| Surfynol CT-211 | 0.15 |
| Proxel GXL | 0.15 |
| Pigment | 2-5 |
| Water | Balance |

*Aluminum chloride was used

TABLE 2

Red Ink-jet ink (Formulation 2)

| Components | Batch wt % |
|---|---|
| Styrene Acrylic Polymer (MW 5000) | 0.7 |
| Diethylene Glycol | 6 |
| LEG-1 | 1 |
| 2-Pyrrolidone | 10 |
| 1,2-Hexanediol | 4 |
| Surfynol 440 | 0.5 |
| Zonyl FSO | 0.18 |
| Triethylamine | 0.5 |
| Aluminum [Al(III)]* | 0.002 (20 ppm) |
| Surfynol CT-211 | 0.15 |
| Proxel GXL | 0.15 |
| Pigment | 2-5 |
| Water | Balance |

*Aluminum nitrate was used

Table 1 and Table 2 show the two different red pigmented inks, one containing aluminum chloride and the other containing aluminum nitrate. Both ameliorate silica ring formation and other related problems as described herein. However, data for aluminum nitrate is provided below, though both provide similar results.

Example 2

Silicon Etching Experiments for Ink of Table 2

TABLE 3

| Red ink without Al source | Silicon present (mg/L) | Red ink spiked with 20 ppm Al(III) | Silicon present (mg/L) |
|---|---|---|---|
| Pen 1 | 29 | Pen 9 | 5 |
| Pen 2 | 25 | Pen 10 | 4 |
| Pen 3 | 22 | Pen 11 | 7 |
| Pen 4 | 33 | Pen 12 | 5 |
| Pen 5 | 36 | Pen 13 | 6 |
| Pen 6 | 28 | Pen 14 | 5 |
| Pen 7 | 32 | Pen 15 | 7 |
| Pen 8 | 48 | Pen 16 | 5 |
| Average of Pens 1-8 | 32 | Average of Pens 9-16 | 5.5 |

Various Test ink-jet inks which included approximately 20 ppm of aluminum (III) ions were compared to corresponding Control ink-jet inks without aluminum ions present to determine the effectiveness of aluminum ions in reducing silicon etching. Specifically, various ink-jet ink pens, which included silicon dice, were filled with both Control inks and Test inks and aged for approximately one week. A 0.5 ml ink sample was extracted and tested for silica or silicate impurities (based on silicon atom concentration in the ink) measured in mg/L. The inks spiked with aluminum showed significant decreases in etched silicon in the ink-jet ink compositions. The average amount of silicon atoms present in the ink-jet ink compositions decreased from approximately 32 mg/L to approximately 5.5 mg/L due to the presence of the aluminum atoms.

Additionally, similar results can be achieved in experiments with the aluminum source of Table 1, and similar inks with approximately 5 to less than 20 ppm of aluminum. It was likewise found that, in this particular ink (though not necessarily in all ink formulations), amounts of aluminum over approximately 40-50 ppm of aluminum caused the pigment to crash, which led to ink filter clogging. This being stated, higher concentrations of aluminum can be used in other inks, as the level of crashing is ink specific and is typically determined experimentally.

Example 3

Additional Silicon Etching Trivalent Metal Salt Experiments

Red inks were prepared as described in Table 1 without the addition of chloride trivalent metal ion source. The specific pigment used for all inks was pigment red 168. One ink was maintained as a control, two inks were spiked with Al(III), in the form of aluminum nitrate monohydrate, in different concentrations, and two inks were spiked with Fe(III), in the form of iron (III) nitrate, in different concentrations. As silicate dissolution typically occurs slowly under ambient conditions, the ink pens were stored in 60° C. for one week to simulate 6-12 months of ambient storage. Red pigmented inks were selected for the experiment, as they tend to cause the greatest silicate dissolution for the noted formula. Die soaking was carried out by mixing 100 g of each ink and 10 thermal ink jet dice (type TIJ4) in a bottle and storing at 60° C. for one week. The silicate concentrations were then measured. The distinctions between each ink formulation, as well as the silicate concentration after storage at 60° C., are outlined in Table 4.

TABLE 4

| Ink | Added Metal | Added Metal Concentration (ppm) | Silicate Concentration (ppm) |
|---|---|---|---|
| Control | None | 0 | 38 |
| 1 | Al(III) | 8 | 1 |
| 2 | Al(III) | 22 | 1.2 |
| 3 | Fe(III) | 17 | 19 |
| 4 | Fe(III) | 41 | 1.5 |

As is apparent from the test results, trivalent metal ions, including Al(III) and Fe(III), are effective in inhibiting silicate dissolution, and therefore, effective in inhibiting silicon etching. The inks spiked with aluminum or ferric iron showed significant decreases in silicate in the ink-jet ink compositions. It is also notable that in the case of trivalent iron ions, and in association with the ink-jet ink formulation outlined in Table 1, an increase in concentration greatly decreases the silicate concentration. Thus, in accordance with this example, trivalent ions, such as Al(III) and Fe(III), function to inhibit silicon etching at certain concentrations.

Example 4

Evaluation of Dye-Based Ink Effects on Dice

Dye-based inks, devoid of pigment, were prepared as described in Table 1 without the addition of the pigment or aluminum chloride. Two inks had cyan dye (AB9), and two inks had magenta dye (AR289). One ink of each dye-based ink was maintained as control, and one ink was spiked with Al(III) in the form of aluminum nitrate monohydrate at a concentration of 8 ppm aluminum. Testing proceeded as outlined in Example 3. The results of silicate concentration are outlined in Table 5.

TABLE 5

| Ink | Colorant | Added Al(III) Metal Concentration (ppm) | Silicate Concentration (ppm) |
|---|---|---|---|
| 5 | Cyan dye | None | <0.4 |
| 6 | Cyan dye | 8 | <0.4 |
| 7 | Magenta dye | None | <0.4 |
| 8 | Magenta dye | 8 | <0.4 |

As is apparent from the test results, dye-based inks do not cause silicate dissolution of the dice. As the silicate concentration is negligible, the inclusion of trivalent metal ion in the form of Al(III) did not produce a measurable positive result.

While the invention has been described with reference to certain preferred embodiments, those skilled in the art will appreciate that various modifications, changes, omissions, and substitutions can be made without departing from the spirit of the invention. It is intended, therefore, that the invention be limited only by the scope of the following claims.

What is claimed is:

1. A system for suppressing damaging effects from dissolution of silica in an ink-jet printhead containing basic pH ink, comprising:
    a) an ink-jet printhead including a silicon die structure; and
    b) a basic pH ink loaded in the ink-jet printhead which contacts the die structure during normal storage or use, said basic pH ink including a liquid vehicle, a pigment, and a trivalent metal ion,
    wherein the metal ion passivates the silicon surface by forming a metal ion-silicate complex, thus suppressing the damaging effects or dissolution of silica within the printhead.

2. The system of claim 1, wherein the damaging effects from dissolution of silica contributes to promotion of ink kogation.

3. The system of claim 1, wherein the damaging effects from dissolution of silica contributes to silicate ring formation.

4. The system of claim 1, wherein the damaging effects from dissolution of silica contributes to silicate deposits on ink-jet printhead resistors.

5. The system of claim 1, wherein the trivalent metal ion is aluminum.

6. The system of claim 1, wherein the trivalent metal ion is iron.

7. The system of claim 1, wherein the trivalent metal ion is chromium.

8. The system of claim 1, wherein the pH of the ink is above 8.

9. The system of claim 1, wherein the pH of the ink is above 9.

10. The system of claim 1, wherein the amount of trivalent metal ion added to the ink is from about 5 ppm to about 100 ppm by weight.

11. The system of claim 1, wherein the amount of trivalent metal ion added to the ink is from about 10 ppm to about 50 ppm by weight.

12. A method of suppressing damaging effects from dissolution of silica in an ink-jet printhead containing a pigment-based, basic pH ink, comprising adding a metal ion to the basic pH ink prior to or after the basic pH ink is loaded in the ink jet printhead, wherein the metal ion is a trivalent metal ion, and wherein the metal ion is added at a concentration that passivates the silica surface by forming a metal ion-silicate complex thus retarding the dissolution of silica.

13. The method of claim 12, wherein the damaging effects from dissolution of silica contributes to promotion of ink kogation.

14. The method of claim 12, wherein the damaging effects from dissolution of silica contributes to silicate ring formation.

15. The method of claim 12, wherein the damaging effects from dissolution of silica contributes to silicate deposits on ink-jet printhead resistors.

16. The method of claim 12, wherein the metal ion is aluminum.

17. The method of claim 12, wherein the metal ion is iron.

18. The method of claim 12, wherein the metal ion is chromium.

19. The method of claim 12, wherein the pH of the ink is above 8.

20. The method of claim 12, wherein the pH of the ink is above 9.

21. The method of claim 12, wherein the amount of metal ion added to the ink is from about 5 ppm to about 100 ppm by weight.

22. The method of claim 12, wherein the amount of metal ion added to the ink is from about 10 ppm to about 50 ppm by weight.

* * * * *